3,551,511
METHOD OF PURIFYING CUMENE IN CUMENE PHENOL PROCESS

Giancarlo Aglietti, Roberto Canavesi and Cesare Reni, Milan, Italy, assignors to Società Italiana Resine S.p.A., Milan, Italy, an Italian joint-stock company
No Drawing. Filed Nov. 5, 1968, Ser. No. 773,659
Claims priority, application Italy, Nov. 11, 1967, 22,584/67
Int. Cl. C07c 7/00
U.S. Cl. 260—674    10 Claims

ABSTRACT OF THE DISCLOSURE

Cumene from the acid decomposition products of cumene hydroperoxide or from the exhaust gases of the oxidation of cumene to cumene hydroperoxide is purified hydrogenatively using a supported cobalt/molybdenum or nickel/cobalt/molybdenum catalyst.

---

The invention relates to the purification of cumene.

In the manufacture of phenol and acetone by oxidation of cumene to cumene hydroperoxide, and decomposition of the hydroperoxide, one obtains a reaction mixture separable into an acetone fraction, a phenol fraction and a non-oxidized cumene fraction.

The last mentioned fraction contains more or less considerable proportions of alphamethylstyrene, amounting generally to 1% to 30% by weight of the fraction, as well as oxidized compounds, mainly of the carbonyl type such as methylisobutylketone, mesityloxide (mesethyloxide) and the like, the quantity of which may amount to 1% by weight or more.

The presence of the latter is due to the difficulty of separating them by rectification.

Moreover, at the reaction stage at which cumene is oxidized to its corresponding hydroperoxide, in the presence or in the absence of catalysts, normally by means of an air stream, a cumene fraction is recovered, being removed by the gaseous stream issuing from the oxidizers. This cumene contains impurities which may amount to 5% by weight or more, and is moreover highly corrosive, presumably due to thee presence of acidic compounds.

Neither the cumene fraction which is separated from the decomposition products of the hydroperoxide, nor the fraction recovered from the gaseous stream issuing from the oxidizers can be recycled to the oxidation step as recovered cumene.

The cumene fraction containing the alphamethylstyrene can be hydrogenated to convert the alphamethylstyrene to cumene, the quantity of the further side products more particularly oxygenated compounds, remaining practically unaltered. There are drawbacks to this procedure, for the oxygenated compounds in the recycled cumene reduce the rate of hydroperoxidation of the cumene or, if a predetermined output is to be maintained, the reaction temperature must necessarily be raised, which results in a further increase in the production of side products.

The cumene recovered from the gaseous stream issuing from the oxidizers is treated by a distillative process in order to remove the impurities. In this case there also are drawbacks, for the distillation requires apparatus of corrosion-resistant materials; moreover, the purification is only a partial one on account of the difficulty of separating the impurities by rectification, and the recycled cumene, even after the hydrogenation and distillation processes, is of a corrosive nature unless the impurities in the form of the oxygenated organic compounds are removed.

It is believed that the corrosiveness should be attributed to acidic compounds present in the recycled cumene, or forming in it from carbonyl compounds present as impurities, because on beating cumene with water, 1:1 by volume, acidic aqueous layers result, the pH values of which may be as low as about 3.5 whether samples are taken at once, or 24 hours after the distillation and hydrogenation treatments.

In any case, whatever the causes of this behaviour, there are drawbacks in introducing into the cycle a product corrosive to the plant.

A more advantageous process has now been found, characterized by treating the fraction of cumene containing alphamethylstyrene and the fraction recovered from the gaseous stream issuing from the oxidizer, either separately or mixed together, with molecular hydrogen in a catalytic bed essentially comprising cobalt and molybdenum, nickel and molybdenum, supported on alumina, in order to obtain a recovered cumene which is substantially free from alphamethylstyrene and oxygenated compounds. This cumene, which is free from corrosive properties after treatment and does not tend to acquire such properties with time, may be recycled to the oxidation stage.

The cobalt and molybdenum catalysts suitable for the purposes of the invention contain a quantity of cobalt (expressed as CoC) between 3.3 and 3.8% by weight, and a quantity of molybdenum (expressed as $MoO_3$) between 9.5 and 15.5% by weight. The cobalt, nickel and molybdenum catalysts contain quantities of the metals, expressed as percentages by weight as oxides, between 1.5 and 4.5 (as CoO), 1.5 and 4.5 (as NiO) and 5.0 and 15.0 (as $MoO_3$).

The temperature in the hydrogenation apparatus is preferably not below 200° C. nor above about 350° C.

Temperatures between 250° and 300° C. are preferred; the range between 270° and 280° C. is particularly preferred as optimum reaction conditions prevail within it, avoiding incomplete reduction of the oxygenated compounds such as occur with low temperatures, and cracking processes such as occur with excessively high temperatures.

The operation can be carried out at a pressure ranging from room pressure to about 70 kg./sq. cm.

Under the preferred conditions the selectivity of the hydrogenation process is practically a total one; moreover, the catalysts, as defined above, are insensitive towards impurities contained in the mixture to be hydrogenated and maintain their properties unaltered over extremely long periods. Various tests carried out after 5,000 hour runs showed that the catalysts maintained their mechanical properties as well as their effectiveness and selectivity unaltered. A measurement of the effective surface before and after use gave practically unaltered results.

A suitable cobalt-molybdenum catalyst available on the market, distributed by Catalysts and Chemicals, Inc., is known by the trade name "C20"; a suitable cobalt, nickel and molybdenum catalyst is distributed by Girdler under the trade name "G76."

The use of these catalysts, which have been long known in themselves in industrial practice, has mostly been limited to hydrogenative desulphuretting, denitrifying and de-oxidizing of petroleum fractions by treatment at high temperatures. The effectiveness of the catalysts has been increased by a treatment with hydrogen sulphide before use.

It has now surprisingly been found that these catalysts may be used without any preliminary treatment in a process, namely the process of the invention, requiring a highly selective specific hydrogenating action in respect both of unsaturation and oxygenated compounds, and under conditions under which they (the catalysts) are not normally of an effectiveness suitable for exploitation in industrial processes. Best results are obtained with a stationary catalytic bed or, preferably, with a plurality of stationary beds through which the mixture to be hydrogenated successively flows, the depth of the beds advantageously increasing in the direction of flow.

In order to avoid dangerous rises in temperature, the cumene feed preferably should not contain over 20% by weight of alphamethylstyrene. With feeds having a higher alphamethylstyrene content, the cumene feed may be thinned with purified cumene to rstore it to the indicated range. Alternatively a satisfactory control over the temperature may be exerted by increasing a feed of a fraction of non-purified and/or purified cumene, at a temperature below the normal feed temperature, in the catalytic bed or each of the catalytic beds. The reagents are caused to flow concurrently, generally in a downward direction in a tubular reactor, in ratios such that excess hydrogen, more particularly at a partial hydrogen pressure between 0.5 and 60 kg./sq. cm., is present.

Either pure hydrogen or a gas having, preferably, a hydrogen content exceeding about 70% may be used.

The spatial velocity with reference to cumene may vary within wide limits, generally 0.2 to 1.5 litres of liquid cumene to 1 litre of catalyst per hour.

The following examples illustrate the invention.

EXAMPLE 1

A reactor is employed comprising a steel tube 310 mm. high and 27.5 mm. in diameter, containing 100 ml. catalyst and maintained in a thermostated bath of molten salts.

The catalyst employed in this test comprises cobalt and molybdenum supported on alumina, the cobalt content (expressed as CoO) amounting to 3.5% by weight, the molybdenum content (expressed as $MoO_3$) amounting to 14.0% by weight.

Operation is at a pressure of 5 kg./sq. cm. and a temperature of 270° C. by feeding to the reactor 0.5 volumes of liquid cumene to 1 volume of catalyst per hour, the hydrogen feed amounting to 1 Nl. per ml. liquid cumene.

This test treats a sample of recycled cumene recovered from the acid hydrolysis products of cumene hydroperoxide, having an alphamethylstyrene content of 13.2% by weight and a content of carbonyl compounds expressed as mesityloxide (mesethyloxide) of approximately 4,000 parts per million. The bromine number of this sample is 18.2.

The run is continued for 300 hours and samples of the liquid products are withdrawn at 10 hour intervals. The mean value of the analysis of cumene treated with hydrogen is 0.04 in respect of the bromine number, carbonyl compounds being absent.

EXAMPLE 2

The operation is carried out as in Example 1 except that a gas having a hydrogen content of 78.5% by volume is employed.

With about 300 hours' run the average value of the bromine number is 0.06, the value of the carbonyl compounds being 10 p.p.m. expressed as mesethyloxide (mesityloxide).

EXAMPLE 3

This test treats a cumene sample obtained by mixing a cumene for recycle recovered from the acid hydrolysis products of cumene hydroperoxide in a quantity of 90% by weight, the remaining 10% by weight comprising the cumene recovered from the gaseous products issuing from the oxidizing apparatus of cumene to cumene hydroperoxide. This sample after mixing shows an alphamethylstyrene content of 18.5% by weight and a carbonyl compound content of 7,100 p.p.m. expressed as mesityl (mesethyl)oxide. By beating a fraction of this sample with an equivalent volume of distilled water, an aqueous layer is separated, the pH value of which is 4.1.

The apparatus and catalyst described in the first example are employed.

Operation is at a pressure of 5 kg./sq. cm. and a temperature of 275° C., 1.0 volume of liquid cumene being fed to one volume of catalyst per hour, the hydrogen feed amounting to 1 Nl. per ml. of liquid cumene.

The run is continued for about 300 hours, liquid samples being withdrawn at 10 hour intervals.

The analytic average values of the cumene treated with hydrogen are: 0.1 in respect of bromine number and approximately 1 p.p.m. in respect of carbonyl compounds expressed as mesityl (mesethyl) oxide.

Samples of this cumene beaten with an equivalent volume of distilled water immediately after withdrawal and after 24 hours results in separate aqueous layers, the pH values of which do not differ from those of the water utilized for extraction.

EXAMPLE 4

This test utilizes the apparatus in Example 1 containing 100 ml. of catalyst having a cobalt content (expressed as CoO) of 2.5% by weight and a molybdenum content (expressed as $MoO_3$) of 10.0% by weight, supported on alumina.

The operation is carried out at 250° C. and at a pressure of 20 kg./sq. cm. by feeding 0.5 volume of liquid cumene to 1 volume of catalyst per hour, the hydrogen quantity amounting to 1 Nl. per ml. of liquid cumene.

The cumene employed in this test is the recycle cumene obtained after separation of the acid hydrolysis product of cumene hydroperoxide and contains 6500 p.p.m. carbonyl compounds expressed as mesityl (mesethyl) oxide with an alphamethylstyrene content of 27.9% and a bromine number of 32.4.

The hydrogenator is fed with a mixture comprising 70% by weight of the above described cumene and 30% by weight of purified cumene obtained from a preceding test.

During about 300 hours' run the average values in analysis of the samples withdrawn at 10 hours' intervals are 0.05 in respect of bromine number and 2 p.p.m. in respect of carbonyl compounds expressed as mesityl (mesethyl) oxide.

EXAMPLE 5

A cumene sample recovered from the gaseous products issuing from the oxidisors, having a carbonyl compound content of 10,500 p.p.m. expressed as mesityl (mesethyl) oxide, is treated with hydrogen in the apparatus described in the first example, the operation being carried out at 275° C. at a pressure of 60 kg./sq. cm., the liquid cumene feed amounting to 0.5 volume to 1 volume of catalyst per hour, the hydrogen quantity amounting to 1 Nl. per ml. of liquid cumene.

The apparatus contains 100 ml. of the catalyst described in Example 4.

By beating this cumene with an equivalent volume of distilled water, aqueous layers of pH 3.5 are separated.

The treatment with hydrogen is continued for 300 hours, the samples withdrawn at 10 hours' intervals being practically free from carbonyl compounds. The samples beaten with an equivalent volume of distilled water separate aqueous layers not differing in pH from the water utilized for extraction, both immediately after withdrawal and after ageing for about 24 hours.

What we claim is:

1. A process for purifying cumene recovered from the acid decomposition products of cumene hydroperoxide and from the exhaust gases of the oxidation of cumene to cumene hydroperoxide comprising hydrogenating the cumene recovered with molecular hydrogen in a catalytic bed comprising a catalyst selected from the group consisting of a catalyst comprising from about 3.3 to about 3.8% by weight cobalt and from about 9.5 to about 15.5% by weight molybdenum supported on alumina, and a catalyst comprising from about 1.5 to about 4.5% by weight nickel, from about 1.5 to about 4.5% by weight cobalt and from about 5.0 to about 15.0% by weight molybdenum supported on alumina, the cobalt being expressed as CoO, the nickel being expressed as NiO and the molybdenum being expressed as $MoO_3$, at a temperature within the range of from about 200 to about 350° C., at a feed rate of cumene within the range of from about 0.5 to about 1.5 volumes of cumene per volume of catalyst per hour, and at a pressure within the range of from atmospheric pressure to about 70 kg./sq. cm., until cumene substantially free from alphamethylstyrene and oxygen-containing organic products is obtained.

2. Process according to claim 1, wherein the temperature is 250° to 300° C.

3. Process according to claim 1, wherein the temperature is 270° to 280° C.

4. A process according to claim 1 wherein a cobalt and molybdenum catalyst is used, in which the cobalt percentage (expressed as CoO) is between 3.3 and 3.8 by weight and the molybdenum percentage (expressed as $MoO_3$) is between 9.5 and 15.5 by weight.

5. A process according to claim 1 wherein a cobalt, nickel and molybdenum catalyst is used, in which the cobalt percentage (expressed as CoO) is between 1.5 and 4.5 by weight, the nickel percentage (expressed as NiO) is between 1.5 and 4.5 by weight and the molybdenum percentage (expressed as $MoO_3$) is between 5.0 and 15.0 by weight.

6. Process according to claim 1 wherein the pressure is between 0.5 and 60 kg./sq. cm.

7. The process of claim 4 wherein said catalyst consists essentially of cobalt and molybdenum supported on alumina.

8. The process of claim 5 wherein said catalyst consists essentially of cobalt, nickel and molybdenum supported on alumina.

9. The process of claim 7 wherein said cumene which is purified contains acetone, phenol, alphamethylstyrene and oxidized compounds.

10. The process of claim 9 wherein said cumene which is purified contains acetone, phenol, alphamethylstyrene and oxidized compounds.

References Cited
UNITED STATES PATENTS

| | | | |
|---|---|---|---|
| 2,894,048 | 7/1959 | Schuman | 260—674 |
| 2,976,336 | 3/1961 | Housam et al. | 260—674 |
| 3,436,429 | 4/1969 | Flickinger et al. | 260—593 |
| 3,437,699 | 4/1969 | Flickinger | 260—621 |

CURTIS R. DAVIS, Primary Examiner

U.S. Cl. X.R.

260—593, 597, 621, 683.9